(12) United States Patent
Tasker et al.

(10) Patent No.: US 7,684,555 B2
(45) Date of Patent: *Mar. 23, 2010

(54) METHOD AND SYSTEM FOR FAILOVER CAPABILITY FOR REMOTE CALL CENTER AGENTS

(75) Inventors: Michael E. Tasker, Pleasanton, CA (US); Michelle W. Ng, Sunnyvale, CA (US); Yuan Cai, San Jose, CA (US); Satish B. Ananthanarayana, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1312 days.

This patent is subject to a terminal disclaimer.

(21) Appl. No.: 11/120,051

(22) Filed: May 2, 2005

(65) Prior Publication Data

US 2006/0245551 A1 Nov. 2, 2006

(51) Int. Cl.
*H04M 5/06* (2006.01)

(52) U.S. Cl. .................. 379/265.01; 379/38; 379/45; 379/93.25; 379/106.02; 709/202; 709/205

(58) Field of Classification Search .............. 379/32.04, 379/38, 265.11, 93.25, 210.02, 211.02, 45, 379/106.02, 265.01; 704/273; 709/228, 709/202, 205; 370/270, 352
See application file for complete search history.

(56) References Cited

U.S. PATENT DOCUMENTS

| | | | | |
|---|---|---|---|---|
| 5,181,239 A | * | 1/1993 | Jolissaint | 379/93.25 |
| 5,991,387 A | * | 11/1999 | Shaffer et al. | 379/211.02 |
| 5,999,965 A | * | 12/1999 | Kelly | 709/202 |
| 6,137,862 A | | 10/2000 | Atkinson et al. | 379/34 |
| 6,373,836 B1 | | 4/2002 | Deryugin et al. | 370/352 |
| 6,577,605 B1 | * | 6/2003 | Dagate et al. | 370/270 |
| 6,625,256 B1 | | 9/2003 | Tasker et al. | 379/32.04 |
| 6,665,395 B1 | | 12/2003 | Busey et al. | 379/265.09 |
| 6,668,056 B2 | | 12/2003 | Rupe et al. | 379/266.03 |
| 6,748,072 B1 | * | 6/2004 | McGraw et al. | 379/265.03 |
| 6,748,073 B2 | | 6/2004 | Alvarado et al. | 379/266.01 |
| 6,829,349 B1 | * | 12/2004 | Neale et al. | 379/265.09 |
| 6,834,106 B1 | * | 12/2004 | Pinard | 379/265.01 |
| 7,054,819 B1 | * | 5/2006 | Loveland | 704/273 |
| 7,269,162 B1 | * | 9/2007 | Turner | 370/352 |
| 7,299,259 B2 | * | 11/2007 | Petrovykh | 709/205 |
| 7,428,301 B1 | * | 9/2008 | Clawson | 379/45 |
| 7,492,887 B1 | * | 2/2009 | Stumer et al. | 379/265.01 |
| 7,573,999 B2 | * | 8/2009 | Turcan et al. | 379/265.02 |
| 2004/0218583 A1 | * | 11/2004 | Adan et al. | 370/352 |
| 2005/0198321 A1 | * | 9/2005 | Blohm | 709/228 |
| 2006/0020993 A1 | * | 1/2006 | Hannum et al. | 725/111 |
| 2006/0067501 A1 | * | 3/2006 | Piatt | 379/210.02 |
| 2006/0239441 A1 | * | 10/2006 | Yang et al. | 379/265.11 |

* cited by examiner

*Primary Examiner*—Gerald Gauthier
(74) *Attorney, Agent, or Firm*—Baker Botts L.L.P.

(57) ABSTRACT

A method for providing fail-over capability in a local branch of a call center includes determining, by a local device, which of a plurality of phones are call center phones. The determination is based on a predetermined rule set. In an alternative embodiment, the method may also include determining, by the local device, which of the plurality of call center phones are available for receiving calls. This may include determining whether a "do not disturb" function of each respective call center phone is invoked, and in response, determining whether the call center phone is available. In addition, this method may involve placing, by the local device, each call center phone into a "do not disturb" mode if the call center phone does not answer a call sent to the call center phone.

30 Claims, 2 Drawing Sheets

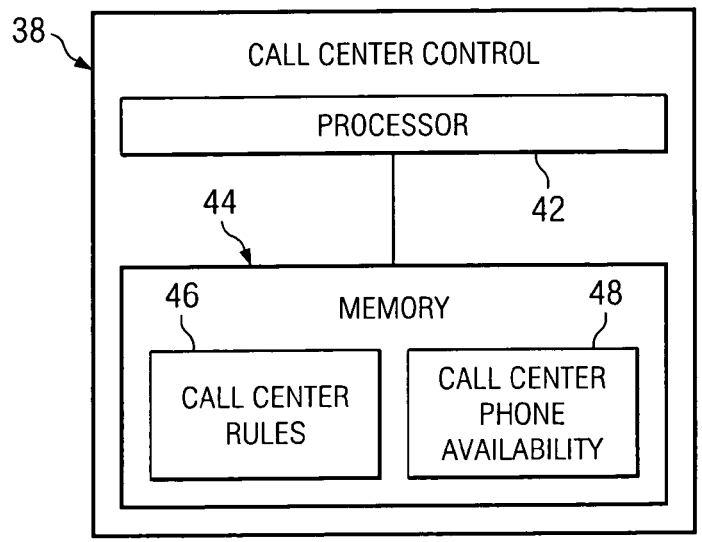
FIG. 2B
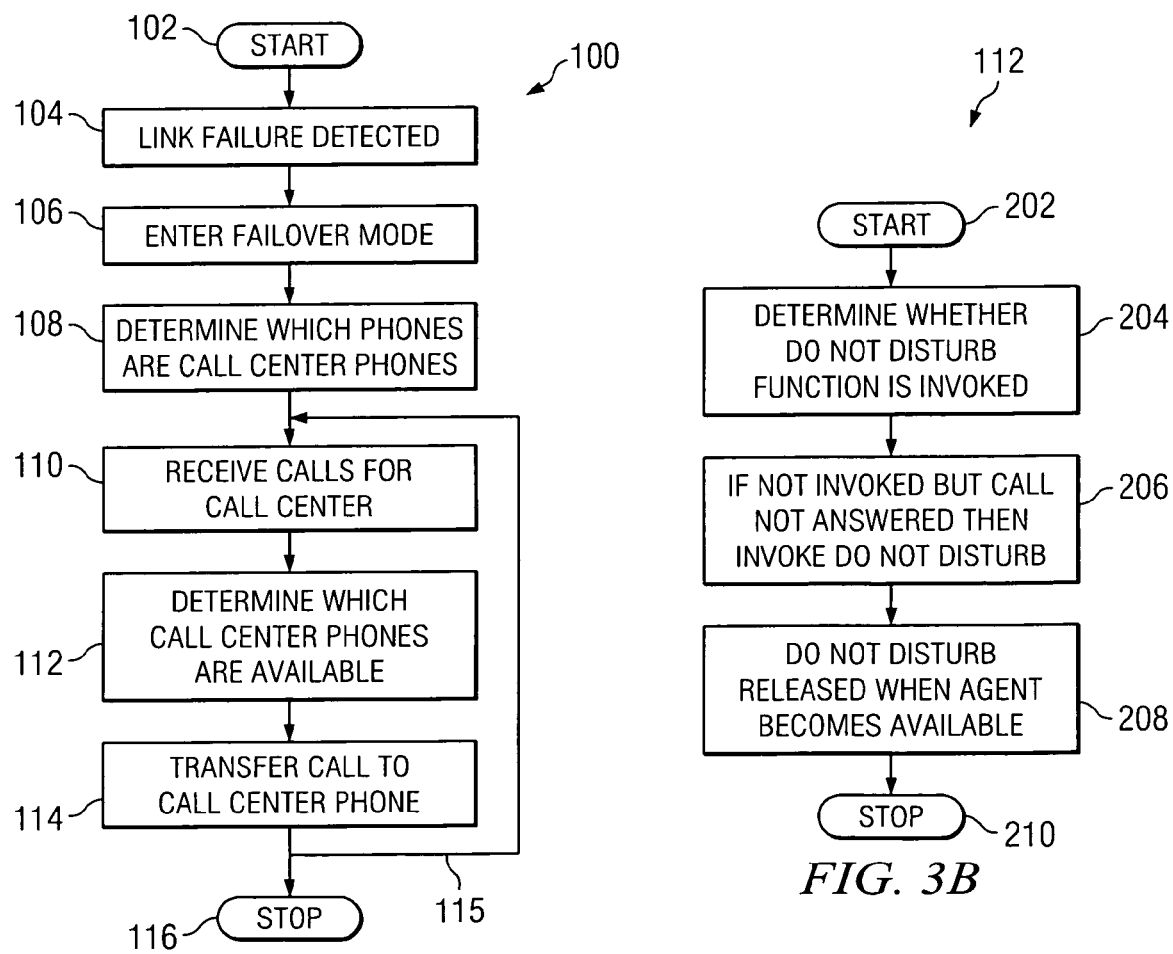
FIG. 3A
FIG. 3B

METHOD AND SYSTEM FOR FAILOVER CAPABILITY FOR REMOTE CALL CENTER AGENTS

TECHNICAL FIELD OF THE INVENTION

This invention relates generally to call centers and more particularly to a method and system for failover capability for remote call center agents.

BACKGROUND OF THE INVENTION

Many existing telephone systems utilize a centralized call manager for controlling phones directly connected to the call manager, as well as for controlling telephones located at remote branches. Using centralized control is beneficial because control software only needs to be implemented in one location and experienced personnel are not required at each of the various branches to maintain associated call manager software. Such a centralized call manager may also be utilized to manage a call center in which a plurality of incoming calls are received by agents. One example of utilization of a call center is for airline reservations. The management of the call center may involve determining which phone in any branch receives a particular phone call. It is important to maintain the capability of a call center even at times where certain portions of the call center network are disabled.

SUMMARY

A method for providing fail-over capability in a local branch of a call center includes determining, by a local device, which of a plurality of phones are call center phones. The determination is based on a predetermined rule set. In an alternative embodiment, the method may also include determining, by the local device, which of the plurality of call center phones are available for receiving calls. This may include determining whether a "do not disturb" function of each respective call center phone is invoked, and in response, determining whether the call center phone is available. In addition, this method may involve placing, by the local device, each call center phone into a "do not disturb" mode if the call center phone does not answer a call sent to the call center phone.

Embodiments of the invention may provide numerous technical advantages. Some, none, or all embodiments of the invention may benefit from the below-described advantages. For example, according to one embodiment of the invention, a failover redundancy for a call center is provided that allows a local branch of a call center to operate even when a communication link between a centralized call manager and the branch is disabled. This functionality may be provided, in some embodiments, without resource extensive hardware and software additions.

Other advantages will be readily apparent to one of skill in the art.

BRIEF DESCRIPTION OF THE FIGURES

For a more complete understanding of the present invention and its advantages, references now made to the following description, taken in conjunction with the accompanying drawings, in which:

FIG. 2B is a block diagram illustrating example details associated with a call center control block of a router of FIG. 2A;

FIG. 3A is a flow chart illustrating example steps associated with a method for providing failover capability for call center agents in a remote branch of a call center; and FIG. 3B is a method illustrating example steps associated with a method for determining whether call center phones in a remote branch of a call center are available to receive calls.

DETAILED DESCRIPTION OF EXAMPLE EMBODIMENTS

Embodiments of the present invention and its advantages are best understood by referring to FIGS. 1 through 3B of the drawings, like numerals being used for like and corresponding parts of the various drawings.

Figure 1:
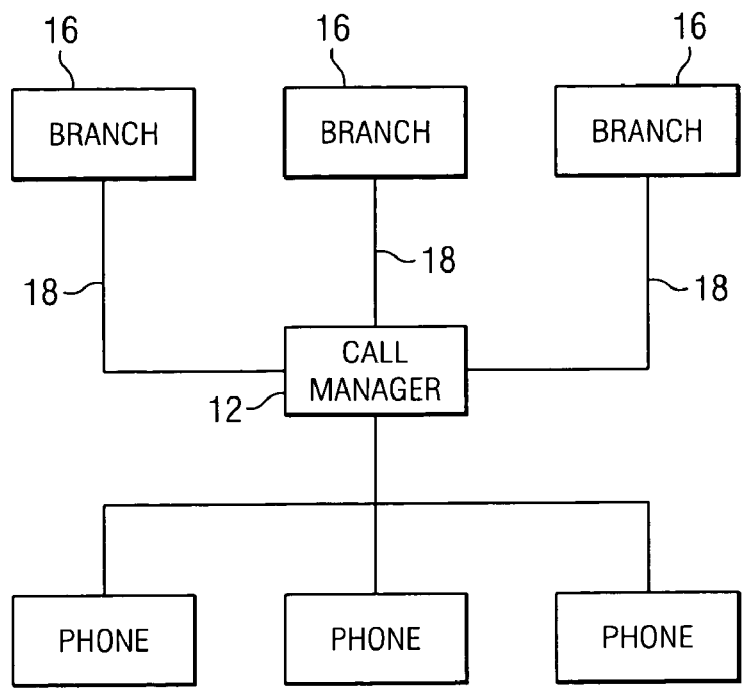
FIG. 1 is a block diagram illustrating a communications system according to the teachings of the invention.

FIG. 1 illustrates a communication system 10 according to the teachings of the invention. Communication system 10 includes a call manager 12 for controlling telephones, or other communication devices, within system 10. In particular, call manager 12 may control telephones 14, which are local to call manager 12, and may also control phones within various remotely-located branches 16 of system 10. Branches 16 are remotely-located branches at which a plurality of telephones (explicitly shown in FIG. 2A) may be located. Call manager 12 communicates with each branch 16 over links 18. Although call manager 12 communicates with each branch 16 through link 18 for control purposes, telephone calls may be received directly by branches 16 from another telephone network.

U.S. Pat. No. 6,625,256, entitled Failover Mechanisms for Remote Network Phones, to Tasker, et al., assigned to Cisco Technology, Inc., which is incorporated herein by references for all purposes, describes a method for providing failover services to phones located at remote branches, such as branches 16. As described in that patent, the link between the call manager and the branch, such as link 18, may be temporarily disabled. This would normally prevent phones in the affected branch 16 from processing telephone calls, because telephones at that branch would be unable to communicate with call manager 12. In many implementations, branch 16 does not include capability for processing telephone calls without control by call manager 12. The '256 patent teaches that a device may be located in branches 16 that provides some capability for call management until communications over the associated link 18 may be re-established.

The teachings of the present invention recognize that system 10 may provide call center operations, in which a plurality of telephones are dedicated to receiving incoming calls and that may be manned by personnel for responding to such calls. In many conventional systems, control of such call center phones is implemented at the centralized call manager 12. Such control may include receiving telephone calls and determining to which branch and to which phones in a particular branch the call should be sent. This may include load balancing as well as processing to determine the appropriate destination for the call. The teachings of the invention recognize that if link 18 between a branch 16 and call manager 12 is disabled or if control by call manager 12 is otherwise disabled, that an alternative method for controlling telephones within the affected branch would be desirable. According to the teachings of the invention, each branch is provided with functionality that enables call center operations to take place in the event of a failover condition. Such failover functionality may include the functionality described in U.S. Pat. No. 6,625,256 referenced above.

In addition to the functionality described in the '256 patent, the teachings of the invention recognize that if centralized control is lost, a determination needs to be made of which phones within branch 16 are call center phones. In a typical telephone network, not all phones at a branch of the network are dedicated to call center processing. Thus, the teachings of the invention provide a method for determining which phones within a particular branch are call center phones. In addition, it may be desirable to determine which of the call center phones are available to receive a call, rather than transmitting a call only to obtain either a busy signal or no answer. Conventionally, the centralized call manager determines which call center phone is available to receive calls. This traditional technique may involve the scheduling of breaks by agents of the call center phones as well as monitoring which phones are off-hook, or busy. Conventionally, branches 16 do not include devices capable of performing any of these functions, relying on call manager 12 to provide this functionality. Example details associated with example embodiments of the invention are described in greater detail below in conjunction with FIGS. 1 through 3B.

Call manager 12 may be a centralized call manager. Call manager 12 may be any network call management application, such as, for example, Cisco's Call Manager; however, any network phone call management application may be used. Typically, call manager 12 is located at the headquarters location of an enterprise. Call manager 12 may have several thousand individual phones 14 as well as a similar amount of phones gathered at the various branch offices 16 that are located remote from call manager 12. Phones 14 may be any type of phone such as mobile phones, cellular phones, IP phones, or other land line phones.

Each branch 16 may include a plurality of telephones, such as phones 14. Typically, each branch 16 may have between ten and few hundred telephones; however, branch 16 may have any suitable number of phones. Example details associated with branch 16 are described in greater detail below in conjunction with FIG. 2A.

Link 18 is typically a low-bandwidth communication link; however, any suitable communication link may be used.

Figure 2A:
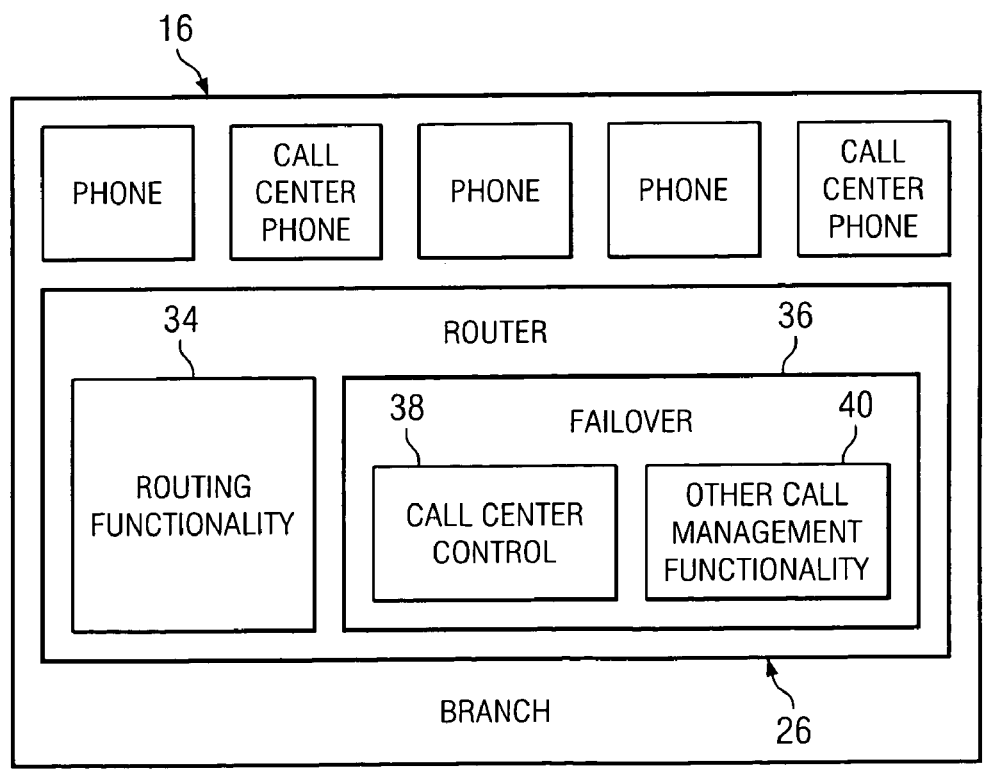
FIG. 2A is a block diagram illustrating an example branch of the communications system of FIG. 1.

FIG. 2A is a block diagram illustrating example details associated with branch 16 of network 10 according to the teachings of the invention. As illustrated, branch 16 includes a router 26 and a plurality of phones 28. Router 26 communicates with call manager 12 over link 18. Traditionally a centralized router 26 included only limited functionality for receiving call routing instructions from call manager 12 and, as described in the '256 patent, may also have included intelligence for routing calls in the event of a failure of link 18, resulting in a loss of communication between branch 16 and call manager 18. As described in greater detail below, according to the teachings of the invention router 26 may include functionality for determining which phones in branch 16 are call center phones and for determining which of those call center phones are available to receive a call; however, it will be understood that this functionality could also be provided locally at branch 16 by devices other than routers, such as stand-alone computers.

Phones 28 include phones 30, such as standard land line phones, IP phones, or other phones, as well as dedicated call center phones 32, which may take any suitable physical form, such as the types described for phones 30. A call center phone 32 refers to a telephone that may be manned as part of a call center operation for receiving incoming calls or for placing outgoing calls.

Router 26 includes a routing functionality block 34 and a failover functionality block 36. Routing functionality block 34 includes functionality for routing calls to an appropriate one of phones 28 at the direction of call manager 12. In the event of a failover condition, or at other desired times, failover functionality block 36 provides call routing capability. As described above, the '256 patent describes certain functionality that may be provided locally at branch 16 in the event of a failover condition. This functionality may be provided by block 40. In addition, functionality associated with determining which of phones 28 are call center phones and which of those call center phones is available to receive a call may be provided by call center control block 38. Functionality provided by call center control block 38 is described in greater detail below in conjunction with FIGS. 2B through 3B.

FIG. 2B is a block diagram showing additional details associated with call center control 38. Call center control 38 may be implemented in any suitable form including hardware, software, firmware, or other suitable technique. In the illustrated embodiment, call center control 38 of router 26 is implemented by a processor 42 and associated memory 44. Memory 44 stores a set of call center control rules, which are described in greater detail below. It will be understood that router 26 may include a single processor and that call center control block 38 utilizes only a portion of that processor. Alternatively, a separate processor may be utilized for each functional unit.

Call center control rules 46 comprise, in this example, software encoded in media that allows the determination of which phones 28 within branch 16 are call center phones. Conventionally, this determination is performed by call manager 12 remotely, and thus in the event that link 18 is disabled, branch 16 is unable to determine which phones 28 are call center phones. Thus, according to the teachings of the invention, a set of rules is prescribed and implemented in call center control 38 for making such a determination. According to one embodiment, the set of rules is simply a list of particular phones that are call center phones. According to another embodiment, the call center phones are identified by phones having a particular extension range and, in yet another embodiment, the call center phones are identified by determining which physical phone model is utilized. In another embodiment, the determination of which phones are call center phones is determined by examining which phones have associated headsets. According to another embodiment, some combination of the above rules is applied. For example, the rules may include the combination of identifying phones of a particular model type and that also have a handset attached. The teachings of the invention recognize that although an explicit list may be useful in some circumstances, maintaining rules that are robust enough to accommodate for frequent addition and deletion of phones from branches 16, and the addition and deletion of phones that perform call center services, is particularly suitable.

Thus, upon the disablement of link 18, call center control 38 identifies which phones 28 are call center phones 32 according to rules prescribed by call center rules 46. Once the determination is made of which phones are call center phones, it may be desirable to further determine which call center phones are available to accept calls. Functionality for making this determination may be stored in memory 44 in call center phone availability block 48. Traditionally, the availability of call center phones, which is based on which call center phones are manned, may involve examination of a schedule that takes into account scheduled breaks of operators. The off-hook status of each phone may also be considered. These functions are traditionally performed by call manager 12. According to the teachings of one aspect of the invention, call center phone availability is performed locally at branch 16 upon entering failover mode. It will be understood that the functionality associated with call center block 38 may be located within devices at branch 16 other than at router 26.

Although it is useful to have a failover procedure to accommodate for rare instances in which link 18 is broken and call manager 12 is unable to control call center operations at the remote branches 16, it can be burdensome and confusing to operators to have detailed instructions for such an occurrence. Thus, according to one embodiment, upon entering failover mode, call center availability block 48 examines the "do not disturb" button associated with each call center phones 32. The "do not disturb" button is a common feature on many telephones that is used when a caller does not wish to receive a phone call. In some implementations, this function merely implements a silent ring, such that a call is directed to the user but the user's phone does not ring. In other implementations, a "do not disturb" button invokes transmission of a signal that prevents calls from being transmitted to the phone.

According to the present embodiment, when entering failover mode, router 26 queries each call center phone 32 and examines the status of the "do not disturb" button of each call center phone 32. If the "do not disturb" function is enabled, this indicates that the call center phone is not available to receive a call. In addition, the router 26 may also examine the hook status of the call center phone to determine if the call center phone is busy. If examination of the "do not disturb" button for a call center phone indicates the call center phone is available to receive a call, a call may be transmitted to the phone. If the transmitted call is not answered, indicating that the attendant may possibly be on a break, then router 26, and in particular, call center phone availability block 48, asserts the "do not disturb" button for the associated call center phone.

The attendants are informed, in advance, that in the event of a failure, the "do not disturb" button will be automatically asserted for the attendants if the attendant does not answer a call during failover mode. The attendant will therefore know that upon returning from a break, the attendant should depress the "do not disturb" button on the phone to turn it off, and therefore indicate its availability to call center phone availability block 48. When examining the "do not disturb" status of a phone, the call center phone availability block 48 will not send a call to a phone that has its "do not disturb" button enabled.

Upon determination of which phones are call center phones and which of those call center phones are available, calls may be routed to the appropriate available phone.

FIG. 3A is a flow chart illustrating a method for routing calls locally in a call center environment according to one aspect of the invention. The method begins at step 102. At step 104 a link failure is detected (or other condition that results in the need for local control at the branch). This detection may be performed according to any suitable technique, including those described in the '256 patent. At step 106 failover mode is entered, in which call routing is performed locally rather than through call manager 12.

At step 108, a determination is made of which phones are call center phones. As described above, this determination may be made based on a plurality of different rule sets, including, for example, reference to an explicit list, reference to a phone extension number range, an examination of the phone model, or examination of whether the phone has a headset associated with it. It will be understood that other rule sets may be utilized on which to base the determination of which phones are call center phones. It will also be understood, that although an explicit list may be used, it is also particularly useful to utilize a rule set that allows addition to, and subtraction from, the phones that are call center phones within a particular branch. It will also be understood that the determination of which phones are call center phones would often be determined after entering failover mode; however, this determination could be made at other suitable times, including making this determination before failover mode is entered or after calls have been received at the branch.

At step 110, calls are received for the call center. According to one aspect of the invention, it may be desirable to determine which call center phones are available rather than possibly routing a call to a call center phone that is unavailable. This determination may be made as described in greater detail below in FIG. 3B. At step 114, the received call is routed to one of the call center phones determined to be available according to prescribed routing rules. Calls are then repeatedly processed as indicated by preference numeral 115. Method 100 concludes at step 116.

FIG. 3B is a flow chart illustrating example steps associated with the above described step 112 of determining which call center phones are available. The method begins at step 202. At step 204 a determination is made of whether a "do not disturb" function is invoked for each call center phone. As described above, the "do not disturb" function may be invoked by an attendant during a failover to indicate unavailability to take calls. At step 206 if the "do not disturb" button is not invoked but a routed call is not answered, then the "do not disturb" button for the associated phone is automatically invoked. At step 208, in response to the automatic invocation of a "do not disturb" button and the returning of an attendant to the phone, the attendant may release the "do not disturb" button when the attendant becomes available. The method concludes at step 210.

Although the present invention has been described with several embodiments, a myriad of changes, variations, alterations, transformations, and modifications may be suggested to one skilled in the art, and it is intended that the present invention encompass such changes, variations, alterations, transformations, and modifications as they fall within the scope of the appended claims.

What is claimed is:

1. A method for providing fail-over capability in a local branch of a call center comprising:
   determining, by a local device, which of a plurality of phones are call center phones, the determination based on a predetermined rule set; and
   determining, by the local device, which of the plurality of call center phones are available for receiving calls, comprising:
      determining whether a do not disturb function of each respective call center phone is invoked, and in response, determining whether the call center phone is available; and
      placing, by the local device, each call center phone into do not disturb mode if the call center phone does not answer a call sent to the call center phone.

2. The method of claim 1, wherein the rule set is an explicit list identifying which of the plurality of phones are call center phones.

3. The method of claim 1, wherein the rule set comprises a telephone number extension range associated with the plurality of phones that are call center phones.

4. The method of claim 1, wherein the rule set includes a list of model identifications of the plurality of call center phones that are call center phones.

5. The method of claim 1, wherein the rule set includes a determination of whether each of the plurality of call center phones has an associated headset.

6. A router located at a branch office in a call center remote from a call manager for the call center, the router comprising:
   software encoded in computer-readable media that when executed is operable to:
      receive a telephone call and route the call to a particular one of a plurality of telephones;
      determine which of the plurality of phones are call center phones, the determination based on a predetermined rule set; and
      determine which of the call center phones are available for receiving calls, the determination comprising:
         determining whether a do not disturb function of each respective call center phone is invoked and in response determine whether the call center phone is available; and
         placing each call center phone into do not disturb mode if the call center phone does not answer a call sent to the call center phone.

7. The router of claim 6, wherein the rule set is an explicit list identifying which of the plurality of phones are call center phones.

8. The router of claim 6, wherein the rule set comprises a telephone number extension range associated with the plurality of phones that are call center phones.

9. The router of claim 6, wherein the rule set includes a list of model identifications of the plurality of call center phones that are call center phones.

10. The router of claim 6, wherein the rule set includes a determination of whether each of the plurality of call center phones has an associated headset.

11. A method for providing fail-over capability in a local branch of a call center having an associated call manager located remote from the remote branch comprising:
    determining, by a local device local to the branch, which of a plurality of phones are call center phones, the determination based on a predetermined rule set:
    wherein determining, by the local device, which of the call center phones are available for receiving calls comprises determining whether a do not disturb function of each respective call center phone is invoked and in response determining whether the call center phone is available.

12. The method of claim 11, wherein the rule set is an explicit list identifying which of the plurality of phones are call center phones.

13. The method of claim 11, wherein the rule set comprises a telephone number extension range associated with the plurality of phones that are call center phones.

14. The method of claim 11, wherein the rule set includes a list of model identifications of the plurality of call center phones that are call center phones.

15. The method of claim 11, wherein the rule set includes a determination of whether each of the plurality of call center phones has an associated headset.

16. The method of claim 11 and further comprising determining, by the local device, which of the call center phones are available for receiving calls.

17. The method of claim 16, wherein determining, by the local router, which of the call center phones are available for receiving calls comprises placing, by the local device, each call center phone into do not disturb mode if the call center phone does not answer a call sent to the call center phone.

18. The method of claim 11, wherein the local device is a router.

19. The method for providing fail-over capability in a local branch of a call center comprising:
    determining, by a local router, which of a plurality of call center phones are available for receiving calls, the determination comprising:
       determining whether a do not disturb function of each respective call center phone is invoked and in response determining whether the call center phone is available; and
       placing, by the local router, each call center phone into do not disturb mode if the call center phone does not answer a call sent to the call center phone.

20. The method of claim 19, and further comprising determining, by the local router, which of a plurality of phones are the call center phones, the determination based on predetermined rules set.

21. The method of claim 20, wherein the rule set is an explicit list identifying which of the plurality of phones are call center phones.

22. The method of claim 20, wherein the rule set comprises a telephone number extension range associated with the plurality of phones that are call center phones.

23. The method of claim 20, wherein the rule set includes a list of model identifications of the plurality of call center phones that are call center phones.

24. The method of claim 19, wherein the do not disturb function of the call center phone operates to provide a silent ring for the call center phone if the call center phone receives a call.

25. An apparatus for use in providing fail-over capability in a local branch of a call center comprising:
    means for determining which of a plurality of phones are call center phones, the determination based on a predetermined rule set; and
    means for determining which of the call center phones are available for receiving calls, including determining whether a do not disturb function of each respective call center phone is invoked, and in response, determining whether the call center phone is available, and placing each call center phone into a do not disturb mode if the call center phone does not answer a call sent to the call center phone.

26. A call center comprising:
    a call manager;
    a plurality of branches, each branch comprising a local device associated with a plurality of local telephones and associated with the call manager;
    wherein the local device is operable to:
       determine which of a plurality of the local phones are call center phones, the determination based on a predetermined rule set; and
       determine which of the call center phones are available for receiving calls by:
          determining whether a do not disturb function of each respective call center phone is invoked and in response determining whether the call center phone is available; and
          placing, by the local device, each call center phone into do not disturb mode if the call center phone does not answer a call sent to the call center phone; and
    wherein the call manager is located remote from the plurality of branches.

27. The call center of claim 26, wherein the rule set is an explicit list identifying which of the plurality of phones are call center phones.

28. The call center of claim 26, wherein the rule set comprises a telephone number extension range associated with the plurality of phones that are call center phones.

29. The call center of claim 26, wherein the rule set includes a list of model identifications of the plurality of call center phones that are call center phones.

30. The call center of claim 26, wherein the rule set includes a determination of whether each of the plurality of call center phones has an associated headset.

* * * * *